Figure 1:
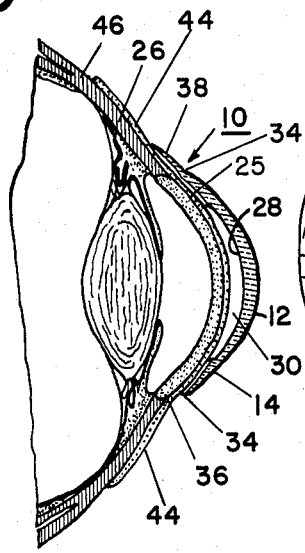

April 19, 1966  H. L. MOSS  3,246,941
CONTACT LENS WITH UPPER CRESCENT SHAPED SCLERAL FLANGE
AND HAVING VENT CHANNELS AND APERTURES
Filed Feb. 28, 1962

INVENTOR.
HERBERT L. MOSS
BY Jacob Trachtman
ATTORNEY 3,246,941
CONTACT LENS WITH UPPER CRESCENT SHAPED SCLERAL FLANGE AND HAVING VENT CHANNELS AND APERTURES
Herbert L. Moss, 845 Field Ave., Plainfield, N.J.
Filed Feb. 28, 1962, Ser. No. 176,223
1 Claim. (Cl. 351—160)

The invention relates to contact lenses, more particularly to contact lenses for application to the human eye.

Heretofore, corneal and scleral type contact lenses have been provided for application to the human eye. However, such lenses have disadvantages which one manner or another have limited their usefulness.

It is, therefore, an object of the invention to provide a new and improved contact lens which provides:

(a) Greater stability due to size and alignment with periphery of cornea, (b) Greater stability due to holding power of semi-scleral flange, (c) Greater stability due to less interference with lid movements, (d) Complete nutrition of corneal tissues due to ingress and egress or oxygen and lacrimal fluid through vents and channels, (e) Elimination of corneal edema from friction on corneal epithelium due to minimal motion and proper nutrition of cornea, (f) Elimination of corneal distortion due to pressure on the apex of the corneal tissues, (g) Elimination of apical corneal abrasion because of shifting of pressure away from the critical, sensitive apex portion of the cornea to the periphery, (h) Increased wearing time due to proper nutrition of cornea provided by vents and channels which minimizes the onset of edema and corneal asphyxiation, (i) Elimination of pressure on cornea at the critical apical portion due to peripheral lift, thus preventing corneal damage, (j) Relief of some corneal pressure in the periphery because of scleral flange which rests on the tough scleral tissue and absorbs some of the pressure of the upper lid, (k) Better fitting of toricity of periphery of cornea by variation of thickness of peripheral flange sections, (l) Elimination of rocking motion encountered in corneal lenses on toric cornea which causes corneal edema and resultant abrasions from pressure and motion, (m) Permitting the correction of residual astigmatism by preventing rotation of the lens as encountered in the corneal lenses by variation of the thickness of the sections of the peripheral portion of the contact lens and holding action of the semi-scleral flange, (n) Elimination of "spectacle blur" or inability to use the original corrective lenses due to increase or decrease of corneal curvature or distortion of corneal epithelium due to pressure, friction from movement and resultant edema, and allowing patients to easily alternate between contact lenses and original prescription, (o) Marked improvement of initial sensation upon insertion of lenses and shorter period of adaptation over corneal lenses of any type previously designed and prescribed, (p) Superior fitting ability in cases of keratoconus due to fitting of periphery of the cornea which is reasonably normal in slope combined with clearance over the distorted protruding apical area, (q) Use as a cosmetic lens to hide unsightly scars due to size which covers the entire cornea and permits painting of iris and pupil to match the normal eye, and provides minimal movement to give a much better appearance then the present cosmetic corneal lenses, and (r) Elimination of a bulging or glassy eye effect and giving a natural appearance for the eye.

The above objects, as well as many more objects of the invention, are achieved by recognizing that, to date, all previous types of scleral or corneal contact lenses were based upon an incorrect evaluation of the typography of the cornea and its adjoining sclera.

It has been generally assumed that the cornea had a central portion spherical or toroidal in nature from 4 to 6 millimeters in diameter surrounded by an area paraboloidal in nature with greater radii in the periphery. The central zone is referred to as the optic cap, and the remaining area as the periphery of the cornea.

It was further assumed that the sclera adjacent to the cornea at an area called the limbus or sulcus was in the form of a radius of curvature and, therefore, the sulcus was formed by the merging of two radii of curvatures.

It has been my observation from numerous studies of various cornea and sclera that these assumptions are not valid. My investigation of corneal and sclera surfaces of the human eye indicates that the vast majority are shaped in the following manner:

(1) The central portion or optic cap is an area 4 to 7 millimeters in diameter which is relatively spherical or toroidal and the radii of curvature are regular, (2) The peripheral quadrant areas of the cornea are by no means radii of curvature, but can best be described as having a slope which not only varies within its quadrant, but also varies from quadrant to quadrant. It is by no means symmetrical, and the slope also varies from one meridian to another of the cornea. For the most part, the slop seems to be greatest in the nasal section, and decreases in degree from the temporal to superior to inferior area, and (3) The sclera, adjacent to the cornea, is also a slope rather than a radius of curvature as previously indicated. It joins the cornea at angles which vary from eye to eye and usually vary from one area to the other in the some eye. This angle can very from 0 degrees to approximately 40 degrees in the average.

With this new concept in mind, I have designed a contact lens which gives due consideration to these very important factors.

Basically, the contact lens I have invented can be broken down into sections as follows:

(1) Central
(2) Peripheral
(3) Scleral
(4) Corrective

The central portion can also be called the optical portion because it is designed to extend over and be aligned with the central section of the cornea. The surface of the central portion is spherical or toroidal depending upon the correction required by the particular eye that is being fitted.

The apex of the central portion of the lens extends in the order of 8.00 to 9.00 millimeters above the surrounding peripheral portion of the lens. The inner surface of the central portion of the lens provides a clearance in the order of .05 to .1 millimeter with the optic cap or apex of the cornea. This clearance thus provides a narrow chamber which is filled with lacrimal fluid. Air and lacrimal fluid enter and leave the chamber through the channels and air vents. The average size of the channels is 1.00 millimeters in width and the two vents are .05 millimeter in diameter. Both can be varied in number, size and location if it is deemed advisable.

The limbal or peripheral portion of the lens is designed with a slope matching the slope of the peripheral sections of the cornea to exert an even pressure over the entire area of contact. In the event of significant differentials in the four quadrants of the cornea, the four sections which form the limbal or peripheral portion can be varied in thickness and slope to accommodate any corneal variation.

The scleral flange portion of this contact lens also is provided with a fitted slope, and so designed and calibrated to merge as closely as possible with the scleral tissues in the superior half of the eye. This scleral flange goes approximately one-half way around the circumference of the lens, and varies from 1.00 to 3 millimeters in width at its widest portion. It may be the shape of a crescent or any variation created by broadening the center of the crescent. It is designed so that it rests upon the sclera with a minimum amount of pressure upon the blood vessels and conjunctive tissues, and will thus create little interference with corneal metabolism. The purpose of this scleral flange is to bridge the limbal area, stabilize the contact lens, and relieve the pressure of the upper lid from transmission to the cornea through the contact lens.

This is most vital in preserving the integrity of the corneal tissues, and preventing edema of the cornea. All prior contact lenses are either composed of a full scleral section that rested all around on the scleral tissues and cleared the cornea completely or the corneal type which rest entirely upon the cornea. Both of these types have had drawbacks and the former are no longer in popular use except for a limited number of patients and specific conditions. The corneal type of lens has the disadvantage of causing corneal changes in the nature of edema, epithelial distortion, visual disturbances and in many instances, corneal exhaustion with resultant inability to continue wearing lenses.

The corrective portion of the contact lens is the same as any corrective lens system. When the lens is in place a complete refraction is done and the resultant correction is ground into the contact lens. This may result in a lens concave, convex, or cylindrical in construction to correct the corresponding type of ametropia.

The material of the lens may be methyl-methacrylate or plastic of similar physical properties. The inside or concave surface may be molded with vents and channels already formed herein. The optical surface is cut by lathe and polished to the power required for correction. This may be spherical or toroidal in nature.

Experience has proven that this lens results in greater initial comfort, relatively little corneal disturbance and prolonged wearing time with no unusual after effects or visual impairment.

Figure 2:
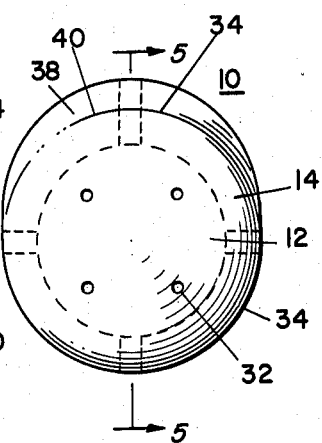
Figure 3:
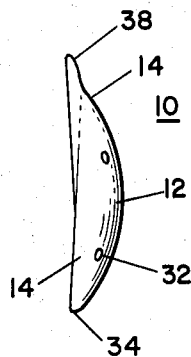
Figure 4:
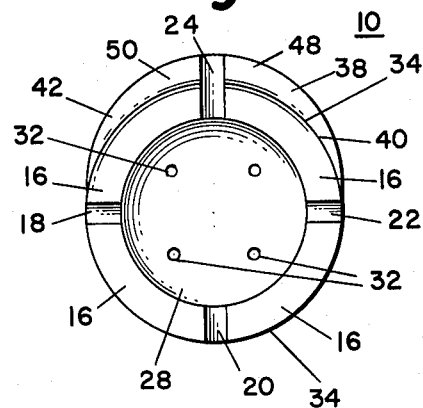
Figure 5:
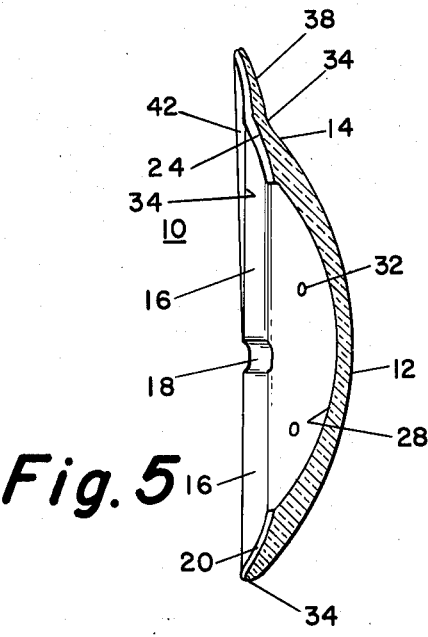

With the foregoing discussion in mind, this invention will be most readily understood from the following detailed description of a representative embodiment thereof, reference for this purpose being had to the accompanying drawing, in which:

FIGURE 1 is a side elevational sectional view of a contact lens embodying the invention applied to a human eye, FIGURE 2 is an enlarged front elevational view of the contact lens shown in FIGURE 1, FIGURE 3 is a left side elevational view of FIGURE 2, FIGURE 4 is a rear elevational view of FIGURE 2, and FIGURE 5 is an enlarged sectional view taken on line 5—5 of FIGURE 2.

Like reference numerals designate like parts throughout the several views.

Referring to the figures, the lens 10 embodying the invention may be made of a transparent material such as methyl-methacrylate or plastic of similar physical properties.

The lens 10 which is adapted for contacting the human eye comprises a central or optic portion 12 which has its inner and outer surfaces contoured to provide such optic correction which is to be provided by the lens 10.

A peripheral portion 14 extends from and is positioned about the central portion 12 of the lens 10 and is provided with inner contact surfaces 16 which are separated into quadrants by the four channels 18, 20, 22 and 24.

The surfaces 16 of the peripheral portion 14 are contoured to tangentially contact the surface of the cornea 25 of the particular individual eye 26 which is to receive the lens 10. As already noted, the sloping areas contacted by the surfaces 16 of the lens 10 differ from eye to eye and from one quadrant to another depending upon the eye being fitted. An inner surface 28 of the central portion 12 of the lens 10 is recessed to form a chamber 30 with the cornea 25 over its apical region. This clearance between the apical region and the inner surface 28 of the central portion 12 may be .05 to .1 millimeter. The chamber 30 is marginally encompassed by the peripheral portion 14, while the channels 18, 20, 22 and 24 in portion 14 provide openings communicating with the chamber 30. A plurality of openings 32 are also provided through the central portion of the lens 10, also communicating with the chamber 30. The outer margin 34 of the peripheral portion 14 is provided to lie within the limbus 36 of the eye when in its normal position in contact with the eye 26.

A crescent shaped scleral flange portion 38 extends from the upper section 40 of the margin 34 of the peripheral portion 14 of the lens 10. The scleral portion 38 bridges the limbus 34 of the eye and is provided with an inner surface 42 tangentially contacting the sclera 44 in the superior portion 46 of the eye. The channel 24 also extends through the inner contact portion of the scleral flange portion 38 providing the portion 38 with left and right scleral contacting surfaces 48, 50 (FIGURE 4) which are contoured to tangentially contact the portions of the scleral surfaces of the particular eye to which the lens 10 is fitted.

The chamber 30 is naturally filled by lacrimal fluids received through the channels 18, 20, 22, 24 and the openings 32 communicating therewith. The channel openings provide for ingress and egress of the air and lacrimal fluids for giving required nourishment for the corneal eye tissues. Fluid circulation is also assisted by the blinking action of the lids and the resulting variation in volume of the chamber 30 due to the compression of the lacrimal fluid layer separating the lens from the corneal tissues provided by such blinking action.

The even distribution of pressure by the contacting surfaces 16, 48, 50 of the peripheral and scleral flange portions 14 and 38 of the lens 10 minimizes pressure upon the eye tissues and blood vessels, thereby minimizing interference with corneal metabolism. The scleral flange portion 38 serves to bridge the limbus 36 of the eye and stabilize the contact lens 10, while relieving the pressure of the upper lids upon the cornea 24 through the contact lens 10. The stabilization achieved also allows the correction of astigmatism since the angular displacement of the lens 10, as well as the horizontal and vertical displacement, are minimized.

From the above construction and application of the lens 10 embodying the invention, it is apparent that by contacting and resting upon the periphery of the cornea and only a portion of the sclera 44 by the scleral flange portion 38, the lens does not rest upon the apical area of the eye, but provides for a chamber which readily receives oxygen and lacrimal fluids. By providing a scleral flange portion which contacts only a limited area of the sclera in the superior half of the eye, the lens 10 does not provide the constricting effect of the scleral lenses which contact the eye over an area completely surrounding the cornea, and the lens 10 provides stability which is not afforded by the corneal type lenses. The lens 10 also avoids the glassy or bulging appearance afforded by scleral type flanges, increases the comfort to the wearer and the ease with which such lenses 10 may be fitted, while avoiding and minimizing harmful effects due to the wearing of contact lenses.

While this invention has been described and illustrated with reference to a specific embodiment, it is to be understood that the invention is capable of various modifications and applications, not departing essentially from the spirit thereof, which will become apparent to those skilled in the art.

What is claimed is:

A contact lens for an eye having a central optic portion, a peripheral portion extending from and about the central portion and having an outer margin within the limbus of the eye and a corneal bearing surfaces conforming to and contacting the peripheral corneal region of the eye, a crescent shaped scleral flange portion extending upwardly from the upper margin of the peripheral portion and having a scleral bearing surface conforming to a contacted superior portion of the sclera, said central portion having a recessed inner surface spaced from the cornea to provide therewith a chamber encompassed by said peripheral portion, and opening means providing for ingress and egress of lacrimal fluid into and out of said chamber, said opening means including a plurality of radial channels provided in the corneal contact surface of said peripheral portion and communicating with said chamber, one of said channels extending to the periphery of said scleral flange and being positioned to bisect said scleral flange, said opening means further including a plurality of apertures extending through said central portion in communication with said chamber, each of said apertures being located between the inner ends of an adjacent pair of channels.

References Cited by the Examiner

UNITED STATES PATENTS

| 2,393,266 | 1/1946 | Riddell | 88—54.5 |
| 2,641,161 | 6/1953 | Silverstein | 88—54.5 |

FOREIGN PATENTS 802,486  10/1958  Great Britain.

OTHER REFERENCES

Abrams: "A New Contact Lens Design," article in "The Optical Journal and Review of Optometry," vol. XCIV, No. 20, Oct. 15, 1957, pages 32 and 33.

Hall: "Experiences in Fitting Microlenses," article in "Contacto," Vol. 2, No. 2, March 1958, pages 57–60.

Hersh: "Eccentrically Ground Secondary Curve," article in "The Optometric Weekly," vol. 51, No. 8, Feb. 25, 1960, pages 377–379.

Moss: "Semi-Sclero-Corneal Flange Lens," article in "Journal of the American Optometric Association," vol. 31, No. 1, August 1960, pages 57 and 58.

DAVID H. RUBIN, *Primary Examiner.*